United States Patent [19]
Huff

[11] Patent Number: 5,816,194
[45] Date of Patent: Oct. 6, 1998

[54] ANIMAL OPERATED WATER DISPENSING VALVE

[75] Inventor: Marvin E. Huff, Hayward, Calif.

[73] Assignee: Novalek, Inc., Hayward, Calif.

[21] Appl. No.: 917,263

[22] Filed: Aug. 25, 1997

[51] Int. Cl.⁶ .................................................. A01K 7/00
[52] U.S. Cl. ........................................................ 119/72.5
[58] Field of Search ........................... 119/72.5; 251/339, 251/208; 137/601, 599

[56] References Cited

U.S. PATENT DOCUMENTS

| | | | |
|---|---|---|---|
| 3,550,560 | 12/1970 | Edstrom | 119/72.5 |
| 4,338,884 | 7/1982 | Atchley et al. | 119/72.5 |
| 4,346,672 | 8/1982 | Niki | 119/72.5 |
| 4,389,977 | 6/1983 | Borak | 119/72.5 |
| 5,363,802 | 11/1994 | Huff | 119/18 |

Primary Examiner—Thomas Price
Attorney, Agent, or Firm—Harris Zimmerman

[57] ABSTRACT

A structurally simple and inexpensive valve enables caged small animals to obtain water on demand by moving the tip of a rod which protrudes from an end of the valve. An annular valve body has a first end fitted into one end of a tube and an opposite end forming a valve seat that faces away from the tube. The rod extends through the tube and through an opening at the center of the valve seat and into a moveable sleeve which seals the opening when the valve is in the closed condition. Resilient material extends between the valve body and movable sleeve to support the sleeve and rod and to bias these components towards their opening sealing position. At least the portion of the rod which extends within the valve seat opening is of smaller diameter than the opening thereby enabling opening of the valve by pivoting movements of the rod as well as by axial movement of the rod. The inlet end of the valve may be situated within the outlet spout of an animal water bottle or other water source.

9 Claims, 2 Drawing Sheets

ANIMAL OPERATED WATER DISPENSING VALVE

TECHNICAL FIELD

This invention relates to apparatus for providing water or other fluids to caged small animals and more particularly to valves which dispense water on demand in response to manipulation of a component of the valve by an animal.

BACKGROUND OF THE INVENTION

Use of open dishes to provide water to caged small animals can create problems. The animal's activities may, for example, cause spillage and/or contamination of the water with debris. This makes maintenance of the animal cage more burdensome and can adversely affect the animal's health. It has heretofore been recognized that problems of this kind can be alleviated by use of a closed water bottle or closed water conduit having an outlet containing a valve which dispenses water in response to manipulation of a component of the valve by an animal and which closes when the animal ceases to manipulate the component.

Many caged small animals, such as hamsters, rats and rabbits among other examples, are children's pets. Commercial operations involving confined small animals often require large numbers of water dispensers. These factors make it desirable that the water dispensing valves be economical to manufacture so that they may sold for a low affordable cost. An undesirably complex construction and/or required precise machining of parts and tight tolerances have adversely affected prior water dispensing valves in this respect.

An animal must learn how to operate the water dispensing valve. Some prior water dispensing valves are openable only by a strictly axial movement of a rod which protrudes from the end of a tubular spout. It would facilitate obtaining of water by an animal if the valve responded to other kinds of movement of the rod as well.

The present invention is directed to overcoming one or more of the problems discussed above.

SUMMARY OF THE INVENTION

In one aspect of the present invention, an animal operated valve for dispensing fluid has an inlet end for connection to a fluid supply and an outlet end at which the fluid is dispensed. A valve seat in the fluid flow path faces towards the inlet end. A movable rod extends into an opening in the valve seat and also extends to the outlet end of the valve to enable manipulation of the rod by an animal. The valve further includes a movable member which seats against the valve seat to close and seal the opening and which is affixed to the rod. At least a portion of the rod which extends within the valve seat opening has a thickness which is smaller than the size of the opening thereby enabling pivoting movement of the rod including the moveable member by an animal and consequent lifting of at least a portion of the moveable member from the valve seat opening to enable fluid flow therethrough.

In another aspect the invention provides an animal operated valve for dispensing fluid from a fluid supply outlet conduit which includes a cylindrical tube having open opposite ends. An annular valve body has a first end which is fitted into a first of the opposite ends of the tube and has a flat opposite end. The opposite end is outside of the tube and faces away from the tube, the flat opposite end being an annular valve seat having a centered opening therein. The annular valve body has a flange which abuts the first end of the tube and has an annular recess which encircles the valve body at a location which is outside of the tube and between the flange and the valve seat. A body of resilient material has an annular first region which encircles the recess and which extends into the recess, the body of resilient material having a second region which extends radially inward from the first region to a movable sleeve portion of the body of resilient material. The moveable sleeve portion is in coaxial relationship with the annular valve seat and is positioned to seat against the valve seat to close the opening thereof. The moveable sleeve portion of the resilient body is fitted onto an end of a rod which extends through the valve seat opening and through the tube and which protrudes from the tube. At least a portion of the rod which extends within the valve seat opening is of smaller diameter than the valve seat opening whereby an animal may pivot the rod and thereby lift at least part of the moveable sleeve away from the valve seat.

The invention provides a structurally simple and inexpensive animal operated valve for dispensing water or other fluids on demand. In the preferred form the valve may have only a small number of components, none of which require precision machining and/or tight tolerances. The animal obtains water or other fluid by moving the end of a rod at the outlet end of a fluid dispensing tube. Obtaining of water or other fluid by the animal is facilitated as the valve is responsive to pivoting of the rod as well as to axial movement of the rod.

The invention, together with further aspects and advantages thereof, may be further understood by reference to the following description of the preferred embodiment and by reference to the accompanying drawings.

DETAILED DESCRIPTION OF THE PREFERRED EMBODIMENT

Figure 1:
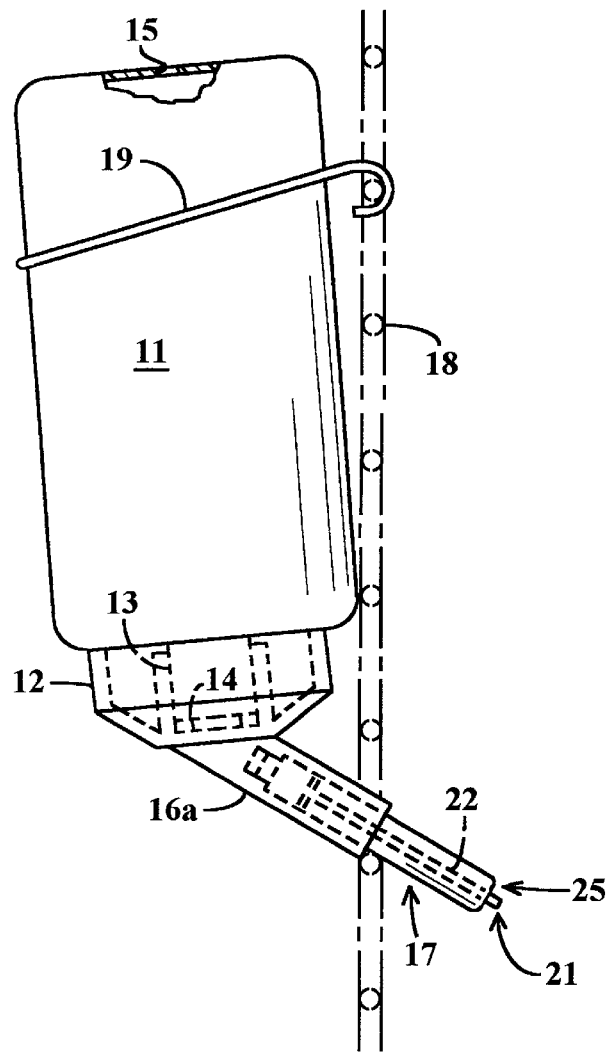
FIG. 1 is a side view of an animal watering bottle having an animal operated water dispensing valve embodying the invention.

Referring initially to FIG. 1 of the drawings, the invention may be used with an animal water bottle 11 which in this example is of the type having a closure cap 12 which screws on to a threaded neck 13 of the bottle and which compresses an annular washer 14 against the neck of the bottle to inhibit leakage. An angled tubular spout 16a extends from the cap 12 and an animal operated water dispensing valve 17, which will be hereinafter described, protrudes from distal end of the spout. A vent opening 15 in the end of the water bottle that is opposite from closure cap 12 enables water outflow when the valve 17 is in the open condition. In use the water bottle is inverted and fastened to the wall 18 of the animal cage. Spout 16a extends through one of the openings that are typically present in the mesh walls 18 of animal cages and the upper portion of the bottle 11 is supported by a wire bail hanger 19 or by other means. The animal temporarily opens the valve 17 to obtain water by manipulating an end 21 of a rod 22 that protrudes from the outlet end 25 of the valve 17.

Figure 2:
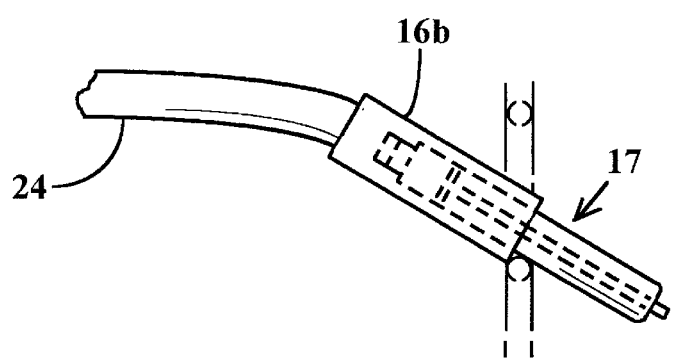
FIG. 2 is a side view of an animal watering installation having an animal operated dispensing valve embodying the invention at the outlet of a water pipe.

The water dispensing valve 17 is not limited to use with a water bottle 11. Referring to FIG. 2 for example, the valve 17 may be fitted into a cylindrical spout 16b at the outlet of a water supply pipe 24 that is connected to a remote source of water.

Figure 3:
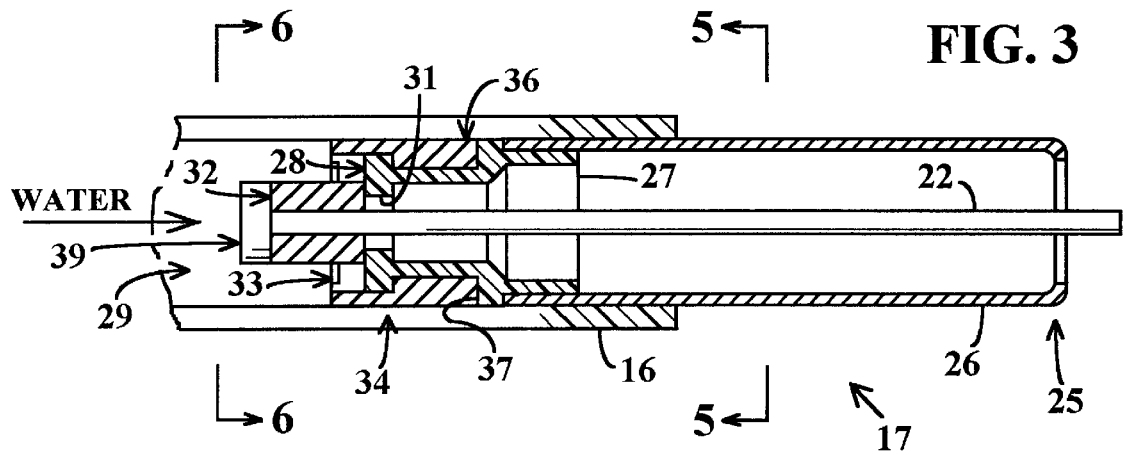
FIG. 3 is a first axial section view of the valve of the preceding figures showing the valve in the closed condition.
Figure 5:
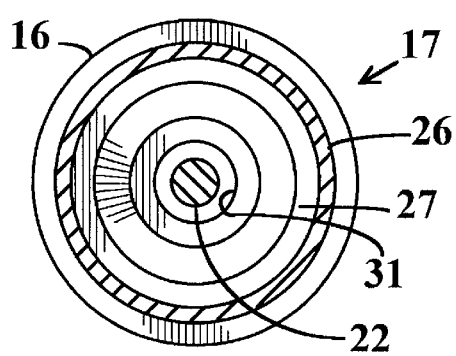
FIG. 5 is a cross section view of the valve taken along line 5—5 of FIG. 3.
Figure 6:
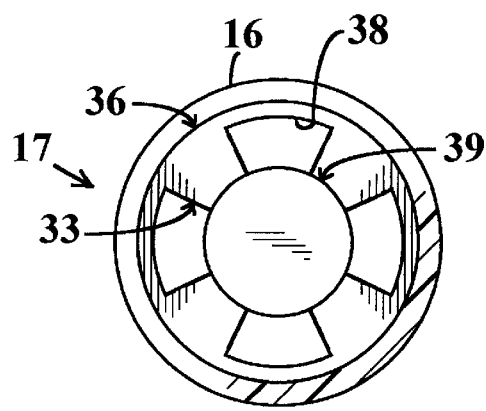
FIG. 6 is an end view of the valve taken along line 6—6 of FIG. 3.

Referring jointly to FIGS. 3, 5 and 6, components of valve 17 include a cylindrical tube 26 which extends into the end of the water supplying spout 16 and which protrudes from the end of the spout. Tube 26 is preferably formed of a material that is resistant to gnawing and clawing by animals, stainless steel being one example of a suitable material. An annular valve body 27, which may be formed of plastic for example, is situated within spout 16 and has one end fitted into an adjacent end of tube 26 and a flat opposite end which functions as a valve seat 28. Valve seat 28 faces the flow inlet end 29 of the valve 17, is of lesser diameter than the inside diameter of spout 16 and has an opening 31 which extends through the center of the valve seat. The tube 26 and valve body 27 may be press fitted together and be press fitted in the spout 16 or adhesive or other means may be used to secure the components together.

In the absence of intervention by an animal, the valve seat opening 31 is closed and fluid flow through the valve 17 blocked by a moveable member 32 which is formed of resilient material such as rubber for example. The moveable member 32 is cylindrical in this example of the invention. Additional resilient material 33 urges the moveable member 32 against the valve seat 28 and also urges the member towards a centered relationship with the valve seat opening 31 at which it is coaxial with the opening and with the valve body 27 and tube 26.

In the preferred form of the invention the moveable member 32 and additional resilient material 33 are portions of a single integral body 34 of resilient material. The resilient body 34 has an annular first region 36 which encircles valve body 27 and which is formed to extend into a circular groove 37 on the valve body and thereby hold the resilient body in place. The first region 36 of the resilient body 34 extends from valve body 27 to a location at which it also encircles the moveable member 32. The additional resilient material 33 which biases moveable member 32 towards valve seat opening 31 is a second region of the resilient body 34 which second region is of flat disk form and which extends radially between the annular first region 36 and the moveable member. The additional resilient material 33 is sufficiently thin to enable lifting of at least a portion of the moveable member from the valve seat opening 31 by applied forces. The additional resilient material 33 has at least one open area 38 through which water may flow from the inlet end 29 of the valve to the valve seat opening 31 when the valve is in the opened condition. In the preferred form of the invention there are a plurality of such open areas 38, four in this example, which are of similar shape and size and which are equiangularly spaced apart around the centerline of the valve 17.

Linear rod 22 has a flange 39 at one end which abuts moveable member 32. The rod 22 extends from flange 39 through the moveable member and through valve body 27 and tube 26 and protrudes for a short distance from outlet end 25 of the valve. The previous described resilient material 33 holds the moveable member 32 and thus the rod 22 in alignment with the centerline of the valve in the absence of an animal applied lateral force on the rod.

Figure 4:
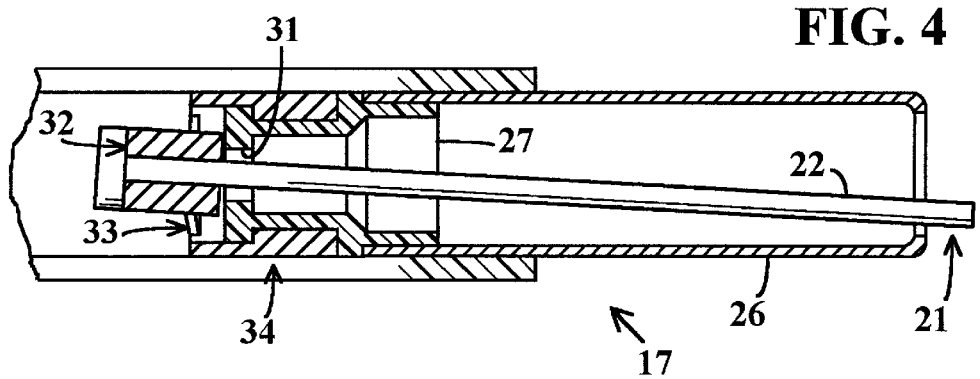
FIG. 4 is a second axial section view of the valve of the preceding figures showing the valve in the open condition.

The valve 17 can be opened to release water by pushing rod 22 in an axial direction to lift moveable member 32 from valve seat opening 31 but it is not necessary that the force be applied in a strictly axial direction. Referring to FIG. 4, at least the portion of the rod 22 which extends within the valve seat opening 31 has a diameter that is sizably smaller than the diameter of the opening itself. This enables pivoting movement of the rod 22 in response lateral forces that are applied to the tip 21 of the rod from any lateral direction. Pivoting of the rod 22 also pivots the moveable member 32. This unseats at least a portion of the moveable member 32 from valve seat opening 31 thereby allowing water to flow through the tube 26. When the lateral force is removed from rod tip 21, resilient material 33 restores the moveable member 32 and rod 22 to their original positions at which the valve seat opening 31 is closed and sealed and water flow ceases.

The force which the resilient material 33 exerts on moveable member 32 to center the member at valve seat opening 31 must be overcome by the animal if it is to obtain water. In this connection it should be noted that the rod 22 functions as a lever which amplifies the force which is exerted on the end of the rod by the animal's nose, mouth or tongue or in some other manner depending on the species.

This preferred embodiment of the valve 17 has only four parts, tube 26, valve body 27, resilient body 34 and rod 22, none of which require precise machining and tight tolerances. The valve 17 can be easily assembled by press fitting the valve body into tube 26, snapping the resilient body 34 onto the valve body, inserting rod 22 and then press fitting the assembly into the spout 16 of a water bottle or other water source.

The valve 17 has been herein described as a water dispenser. It can also be used to provide other fluids to animals such as liquid nutrients or medicinal solutions for example.

While the invention has been described with reference to a single preferred embodiment for purposes of example, many modifications and variations of the animal watering apparatus are possible and it is not intended to limit the invention except as defined in the following claims.

It is claimed:

1. An animal operated valve for dispensing fluid from a fluid supply which valve forms a fluid flow path with an inlet end for connection to said fluid supply and an outlet end at which fluid is dispensed, a valve seat in said fluid flow path which faces said inlet end, a movable rod which extends into an opening in said valve seat and which extends to said outlet end to enable manipulation of the rod by an animal, and a movable member which seats against said valve seat to close and seal said opening, said movable member being movable in response to animal manipulation of said rod to enable fluid flow through said opening, wherein the improvement comprises:

said moveable member being affixed to said rod and wherein at least a portion of said rod which extends within said valve seat opening has a thickness which is smaller than the size of said opening thereby enabling pivoting movement of said rod including said moveable member by an animal and consequent lifting of at least a portion of said moveable member from said valve seat opening to enable fluid flow therethrough, further including resilient material in said valve positioned to urge said moveable member towards said valve seat and to urge said moveable member and said rod toward a centered relationship with said valve seat opening, further including a tube forming at least a portion of said flow path which includes said outlet end thereof and wherein said valve seat is a first end surface of an annular valve body which has a second opposite end that is fitted into said tube, wherein said resilient material is a body of resilient material having an annular first region which encircles said annular valve body and which extends axially therefrom to a location which encircles said moveable member, said body of resilient material having a second region at which said resilient material extends inward from said annular first region to said moveable member, said second region having at least one open area which enables fluid flow through said second region.

2. The apparatus of claim 1 wherein said second region of said body of resilient material has a plurality of said open areas situated at equal angular intervals around said moveable member.

3. The apparatus of claim 1 wherein said annular valve body including said valve seat end surface thereof protrudes axially from an end of said tube, said body of resilient material and said movable member being outside of said tube and being proportioned to be fittable into a flow conduit having an inside diameter conforming with the outside diameter of said tube.

4. The apparatus of claim 1 wherein said moveable member and said body of resilient material including said first and second regions thereof are a single integral body of resilient material.

5. The apparatus of claim 4 wherein said annular valve body has a recess in an outer surface thereof and wherein said annular first region of said body of resilient material is shaped to extend into said recess and thereby resist axial movement of said first region of said body of resilient material relative to said annular valve body.

6. An animal operated valve for dispensing fluid from a fluid supply which valve forms a fluid flow path with an inlet end for connection to said fluid supply and an outlet end at which fluid is dispensed, a valve seat in said fluid flow path which faces said inlet end, a movable rod which extends into an opening in said valve seat and which extends to said outlet end to enable manipulation of the rod by an animal, and a movable member which seats against said valve seat to close and seal said opening, said movable member being movable in response to animal manipulation of said rod to enable fluid flow through said opening, wherein the improvement comprises:

said moveable member being affixed to said rod and wherein at least a portion of said rod which extends within said valve seat opening has a thickness which is smaller than the size of said opening thereby enabling pivoting movement of said rod including said moveable member by an animal and consequent lifting of at least a portion of said moveable member from said valve seat opening to enable fluid flow therethrough, wherein said rod extends through said valve seat opening and protrudes from said valve seat into a region between said valve seat and said inlet end of said flow path and which has a flange situated within that region, said moveable member being a sleeve of resilient material which encircles said rod and abuts said flange.

7. The apparatus of claim 6 wherein said moveable member is a portion of an integral body of resilient material which has first region that is annular and which is fitted onto said valve seat in encircling relationship therewith and a perforated second region that extends inward from said first region to said moveable member.

8. The apparatus of claim 6 wherein said valve seat has a flat surface and said sleeve of resilient material has a flat end surface which abuts said flat surface of said valve seat.

9. An animal operated valve for dispensing fluid from a fluid supply outlet conduit comprising:

a cylindrical tube having open opposite ends, an annular valve body having a first end which is fitted into a first of said opposite ends of said tube and having a flat opposite end which is outside of said tube and which faces away from said tube, said flat opposite end being an annular valve seat having a centered opening therein, said annular valve body having a flange which abuts said first end of said tube and having an annular recess which encircles said annular valve body at a location which is outside of said tube and between said flange and said annular valve seat, a body of resilient material having an annular first region which encircles said annular recess and which extends into said recess, said body of resilient material having a second region which extends radially inward from said first region to a movable sleeve portion of said body of resilient material which moveable sleeve portion is in coaxial relationship with said annular valve seat and positioned to seat thereagainst and close said opening thereof, and said moveable sleeve portion of said body of resilient material being fitted onto an end of a rod which extends through said valve seat opening and through said tube and which protrudes from the second of said opposite ends of said tube, at least a portion of said rod which extends within said valve seat opening being of smaller diameter than said valve seat opening whereby an animal may pivot said rod and thereby lift at least part of said moveable sleeve portion of said body of resilient material away from said valve seat.

* * * * *